United States Patent [19]

Long

[11] 3,795,248

[45] Mar. 5, 1974

[54] PEANUT COMBINE STEMMER SAWS

[75] Inventor: William R. Long, Tarboro, N.C.

[73] Assignee: Long Mfg. N.C. Inc., Tarboro, N.C.

[22] Filed: Oct. 2, 1972

[21] Appl. No.: 293,885

[52] U.S. Cl............................................. 130/30 C
[51] Int. Cl........................................... A01d 29/00
[58] Field of Search ............ 130/30 C, 30 B, 30 R

[56] References Cited
UNITED STATES PATENTS

| 925,983 | 6/1909 | Benthall | 130/30 C |
| 890,401 | 6/1908 | Benthall | 130/30 C |
| 1,195,812 | 8/1916 | Harrington | 130/30 C |
| 2,974,467 | 3/1961 | Long | 130/30 C |

*Primary Examiner*—Antonio F. Guida
*Attorney, Agent, or Firm*—A. Yates Dowell, Jr.

[57] ABSTRACT

Apparatus mounted on a peanut combine for removing stems, dirt and trash from peanuts after the peanuts have been removed from the vines. The apparatus includes a stemmer saw section having a plurality of stemmer saws rotatably mounted between pairs of spaced rods to remove stems from the peanuts and permit foreign material to be discharged from the combine.

3 Claims, 4 Drawing Figures

PATENTED MAR 5 1974

3,795,248

PEANUT COMBINE STEMMER SAWS

BACKGROUND OF THE INVENTION

1. Field of the Invention

This invention relates generally to agricultural harvesting implements of various kinds and relates particularly to peanut combines and apparatus for removing foreign material from the harvested peanuts.

2. Description of the Prior Art

Historically peanut vines have been dug from the ground and stacked around poles to permit the peanuts to dry as well as to permit the stems by which the peanuts were attached to the vines to become brittle so that the peanuts were easily removable. After drying, the peanuts were separated from the vines by hand. However, with the advent of mechanization at approximately the turn of the century, peanut pickers came into general use. These machines normally were located in a fixed position and the peanut stacks were brought to the picker and the picker separated the peanuts from the vines. The pickers were able to separate the peanuts relatively easily since the tough fibrous stems had become dry and brittle.

Efforts were made to remove short pieces of stems which remained on the peanut shells by providing a plurality of stemmer saws and passing the peanuts which had been picked through the stemmer saws. These devices usually included a flat plate with slots through which the stemmer saws extended, and in some instances such as Benthall U.S. Pat. Nos. 890,401 and 925,983 and Livermon U.S. Pat. 1,744,906, a plurality of slats were provided with the stemmer saws disposed between adjacent slats. The slots through which the stemmer saws extended were relatively narrow to accommodate the thickness of the stemmer saws but not wide enough to permit peanuts to fall therethrough. Such slats were of a width to extend from a position adjacent to one stemmer saw to a position adjacent to the next stemmer saw. The distance between the stemmer saws normally is controlled by the length of the hub by which the stemmer saws are mounted on a mandrel. Thus relatively wide slats have been provided and an excessive amount of foreign material has been discharged with the peanuts.

Later developments in the harvesting of peanuts resulted in peanut combines such as Long U.S. Pat. Nos. 2,974,467 and 3,007,475 which gathered peanuts from windrows from two to five days after the peanuts had been dug depending upon weather conditions, separated peanuts from the vines, and discharged the vines back into the field. The separated peanuts passed through a cleaning section including a plurality of stemmer saws, and then were air lifted to a collection bin or other receptacle. Due to the short drying period, the stems remaining on the peanuts are still tough and pieces of stem, dirt, trash and other foreign material have passed through the combine and have been collected in the collection receptacle, together with the peanuts, so that it has frequently been necessary to reclean the peanuts in a subsequent operation.

SUMMARY OF THE INVENTION

The present invention is a stemmer saw section for a peanut combine including a frame having a plurality of spaced rods with the stemmer saws extending upwardly between pairs of rods. Preferably at least two stemmer saw carrying mandrels are mounted in spaced relation to each other and the saws of each mandrel may be located substantially in alignment with each other so that the aligned saws project upwardly between the same rods, or if desired, the saws may be staggered so that the saws of one mandrel will project upwardly between certain rods and the saws of the other mandrel will project upwardly between other rods. The spacing between the rods is sufficient to discharge foreign material from the combine while retaining the peanuts on such rods. The specific cross-sectional configuration of the rods not only encourages the peanuts to move through the stemmer saw section, but also encourages foreign material to move downwardly and be discharged from the combine since there is no flat surface to support the foreign material.

It is an object of the invention to provide a stemmer saw section for a peanut combine including a frame having a plurality of spaced parallel rods of a configuration to encourage foreign material to flow downward therefrom and providing a plurality of stemmer saws rotatably mounted on the frame and projecting upwardly between at least certain of the rods.

DESCRIPTION OF THE PREFERRED EMBODIMENT

Figure 1:
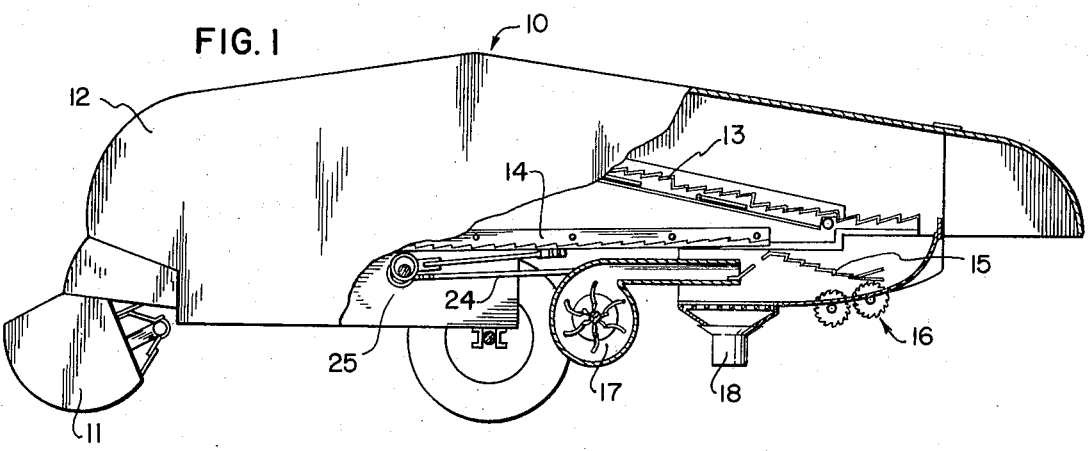
FIG. 1 is a side elevation of a peanut combine with portions broken away and illustrating the environment of the stemmer saw section of the present invention.

With continued reference to the drawing, a peanut combine 10 is provided which may be self-propelled, or may be connected to a propelling vehicle. The combine moves through a field of peanuts several days after the peanuts and vines have been dug and arranged in windrows to permit the peanuts and stems to at least partially dry. It is desirable to harvest the peanuts before the stems become brittle so that the peanuts, particularly the heavy prime peanuts, do not become separated and fall to the ground.

The combine 10 includes a pickup section 11 which removes peanut vines from the ground and transfers the vines, with peanuts attached, to a threshing section 12 where the peanuts are separated from the vines. The vines are discharged from the rear of the combine 10 by a vine rack 13 while loose peanuts, dirt, leaves, small pieces of trash, and other foreign material are directed into a shaker pan 14. The peanuts and other material move lengthwise of the shaker pan and are discharged down a stepped screen 15 to a stemmer saw section 16. From the time the peanuts and foreign material are discharged from the shaker pan 14 until they enter the stemmer saw section 16, they are subjected to a flow of air from a fan 17 which blows some of the light foreign material out of the open rear end of the combine. Pieces of stem, leaves, stones, dirt, and other foreign material which are too heavy to be carried out by the air stream fall to the stemmer saw section 16 with the peanuts. Preferably, the stemmer saw section 16 is vibrated in any conventional manner, as by an arm 24 connected to a rotatable eccentric 25 driven in any desired manner (not shown).

From the stemmer saw section, the peanuts are discharged into an air lift section 18 which elevates the peanuts to a collection receptacle (not shown) normally mounted on the top of the combine 10. Unless the undesirable foreign material is discharged from the combine at the stemmer saw section, such foreign material likewise is air lifted to the collection receptacle. Since clean peanuts demand higher prices, peanuts from the collection receptacle are frequently passed through a recleaning operation to remove foreign material therefrom.

In order to eliminate the time, trouble, and expense of recleaning the peanuts, the stemmer saw section 16 of the present invention includes a frame 20 having a pair of generally parallel side members 21 connected by transverse members 22. A plurality of spaced generally parallel rods 23 are welded or otherwise attached to the transverse members 22 and in generally parallel relationship with the side members 21. The rods 23 are spaced apart approximately three-eighths inch, or a distance sufficient to permit dirt, stones, leaves, and other foreign material to fall between the same while supporting and guiding peanuts thereon.

Figure 3:
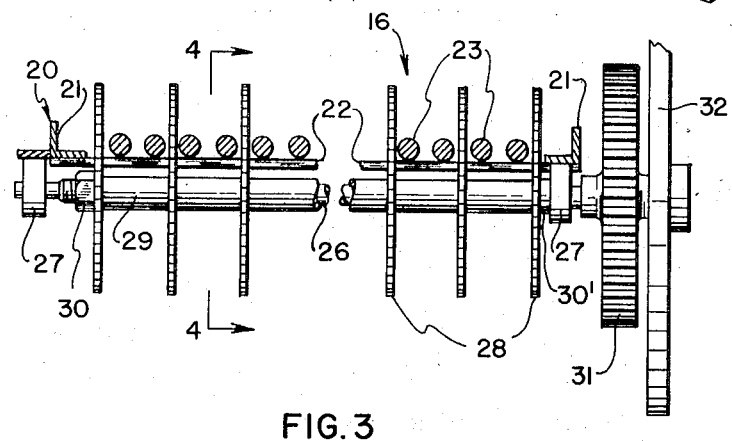
FIG. 3 is an enlarged fragmentary section on the line 3—3 of FIG. 2.
Figure 4:
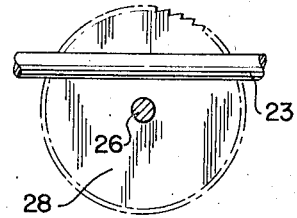
FIG. 4 is a section on the line 4—4 of FIG. 3.

As illustrated in FIG. 3, the rods 23 preferably are substantially circular in cross-section, although any rods having upper surfaces which encourage material to move downwardly by gravity could be used. In order to remove the stems from the peanuts as the peanuts travel along the rods, a pair of mandrels 26 are located below the rods and are journaled in bearings 27 carried beneath the side members 21. A plurality of stemmer saws 28 are mounted on each of the mandrels 26 and such saws extend upwardly through the rods 23. The stemmer saws are mounted in spaced relation on the mandrel by spacers 29. Adjacent to a saw at one end of the assembly is a nut 30 which engages underlying threads on the mandrel. At the opposite end the mandrel has a shoulder 30' which engages the adjacent saw. Nut 30 in cooperation with the shoulder 30' holds all of the saws and spacers simultaneously.

Figure 2:
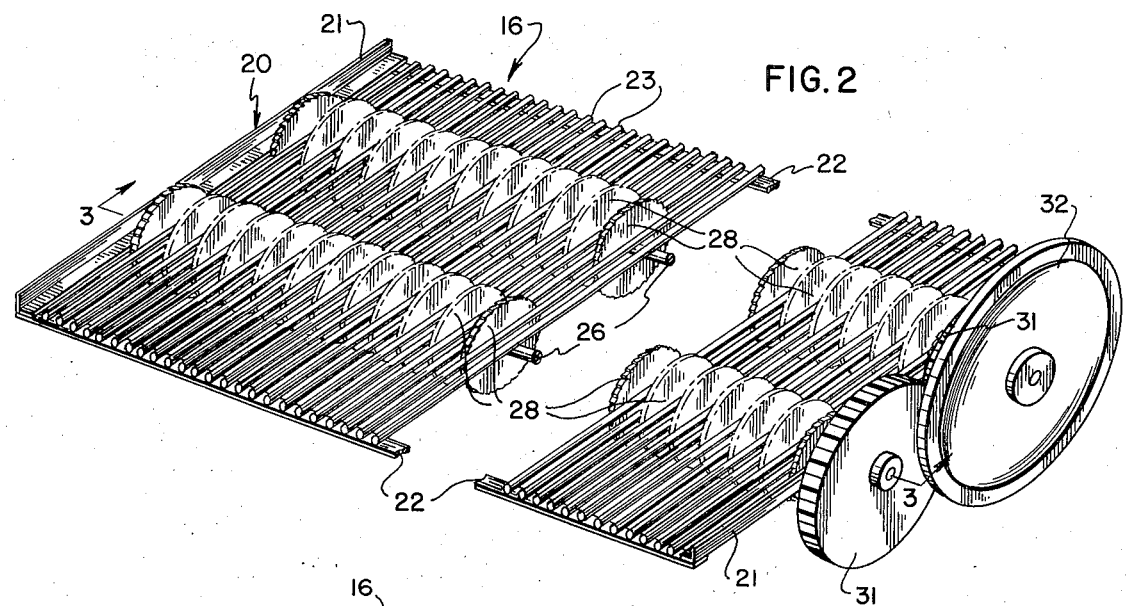
FIG. 2 is an enlarged fragmentary perspective of the stemmer saw section per se.

As illustrated in FIGS. 2 and 3, the stemmer saws are located between alternate pairs of rods 23, however, it is contemplated that the stemmer saws of one mandrel could be staggered relative to the stemmer saws of the other mandrel so that a stemmer saw could be located between each pair of rods.

The mandrels 26 can be driven in any desired manner to cause the stemmer saws 28 to engage stems still on the peanuts and remove such stems. It is noted that the teeth of the stemmer saws are large enough to accommodate a peanut stem but are not large enough to cause damage to the peanut shell. As illustrated, the mandrels 26 are provided with meshing drive gears 31 and one of the mandrels is provided with a drive pulley or sprocket 32 driven by a belt or chain from any desired source of power on the combine 10.

Normally the stemmer saw section 16 is inclined downwardly from the rear toward the front of the combine so that the vibratory action will cause the penauts to gravitate toward the stemmer saws 28 and then to the air lift section 18. During the downward travel of the peanuts, the vibrating stemmer saw section causes the penauts not only to move downwardly, but to move laterally onto adjacent rods so that substantially all of the stems remaining on the peanuts are removed by the stemmer saws 28. The stems which are removed from the peanuts are carried downwardly below the rods and discharged onto the earth below the stemmmer saw section 16. Dirt, stones, and other foreign material which engage the upper surfaces of the rods slide downwardly by gravity and are discharged between the rods to the ground below the combine.

In the operation of the device, peanuts as well as undesirable foreign material which fall from the shaker pan 14 onto the stepped screen 15 and from the stepped screen to the stemmer saw section 16 are subjected to a flow of air from the fan 17. The flow of air from the fan is necessarily relatively light so that peanuts are not discharged from the rear of the combine and only light trash and other foreign material are discharged at this time. The peanuts and the heavier particles of foreign material fall onto the upper surfaces of the rods 23 where any dirt still clinging to the peanuts is jarred loose. Dirt, stones, heavier pieces of trash, and other foreign material gravitate down the upper surfaces of the rods and through the spaces between the rods where they are discharged from the combine onto the earth. The peanuts are unable to pass between the rods and therefore such peanuts slide toward the forward portion of the stemmer saw section by gravity and by the vibratory action imparted by the eccentric 25. The peanuts engage the stemmer saws and any pieces of stem are removed from the shells. After passing the stemmer saws 28, the peanuts are discharged into the air lift section 18 where they are subjected to a strong blast of air and elevated to a collection receptacle. Since most of the foreign material has been separated from the peanuts and discharged from the combine, the necessity of recleaning the peanuts is greatly reduced.

I claim:

1. In a peanut combine having a threshing section for separating peanuts from the vines, a vine discharge rack, pan means for receiving said peanuts and discharging the same from one end, and means for collecting peanuts: the improvement comprising an inclined stemmer saw section for receiving peanuts from said pan means and cleaning the peanuts prior to discharging the same into said collecting means, said stemmer saw section including spaced generally parallel side members, a pair of generally parallel transverse members disposed normal to and connecting said side members, a plurality of pairs of generally parallel rods fixed to said transverse members, each of said rods having an upper surface of a configuration to cause objects to move laterally to a position between said rods, the rods of each pair being spaced apart a predetermined distance sufficient to allow objects smaller than a peanut to pass therebetween but not sufficient to permit peanuts to pass, each pair of rods being spaced from adjacent pairs of distance corresponding to the distance between the rods of each pair, at least one mandrel rotatably supported beneath said rods, a plurality of stemmer saws carried by said mandrel in equally spaced generally parallel relationship to each other and extending upwardly between said pairs of rods so that a pair of rods is disposed between adjacent saws, means for driving said mandrel to rotate said saws, and means for vibrating said stemmer saw section to cause the peanuts to pass through said saws, whereby foreign material is discharged from said combine between said rods, and said stemmer saws remove stems from peanuts moving along said rods.

2. The structure of claim 1 including means for simultaneously locking all of said saws to said mandrel.

3. The structure of claim 1 in which each of said rods is generally circular in cross-section.

* * * * *